(12) United States Patent
Nakatsugawa et al.

(10) Patent No.: US 11,731,603 B2
(45) Date of Patent: Aug. 22, 2023

(54) PIPELINE AND BRAKING SYSTEM

(71) Applicant: Toyota Jidosha Kabushiki Kaisha, Toyota (JP)

(72) Inventors: Eiji Nakatsugawa, Yokohama (JP); Keisuke Ishizaki, Nishio (JP); Tsukasa Ohzawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 515 days.

(21) Appl. No.: 16/918,437

(22) Filed: Jul. 1, 2020

(65) Prior Publication Data
US 2021/0031743 A1 Feb. 4, 2021

(30) Foreign Application Priority Data

Jul. 31, 2019 (JP) .................................. 2019-141536

(51) Int. Cl.
*B60T 17/04* (2006.01)
*B60T 13/14* (2006.01)

(52) U.S. Cl.
CPC ............. *B60T 17/04* (2013.01); *B60T 13/142* (2013.01)

(58) Field of Classification Search
CPC .......... B60T 11/18; B60T 8/42; B60T 13/148; B60T 11/34; B60T 17/046; B60T 8/445; F16L 55/04; F16L 55/027; F16L 55/02718; F16L 55/02709; F16L 55/02727; F16L 55/02754
See application file for complete search history.

(56) References Cited

U.S. PATENT DOCUMENTS

| 4,801,245 | A | * | 1/1989 | de Haas | F04B 11/0091 60/459 |
|---|---|---|---|---|---|
| 5,417,481 | A | | 5/1995 | Megerle et al. | |
| 2001/0003995 | A1 | | 6/2001 | Imaeda et al. | |
| 2008/0093920 | A1 | * | 4/2008 | Fourcade | B60T 17/04 303/12 |
| 2008/0233856 | A1 | * | 9/2008 | Okawa | F16L 55/033 454/143 |
| 2018/0027466 | A1 | | 1/2018 | Trott et al. | |
| 2018/0274661 | A1 | | 9/2018 | Ono et al. | |

FOREIGN PATENT DOCUMENTS

| AT | 514205 A4 | * | 11/2014 |
|---|---|---|---|
| CN | 1392937 A | * | 1/2003 |
| CN | 201227994 Y | * | 4/2009 |
| CN | 103615625 A | * | 3/2014 |
| CN | 105351667 A | * | 2/2016 |
| CN | 205478676 U | * | 8/2016 |

(Continued)

*Primary Examiner* — Robert A. Siconolfi
*Assistant Examiner* — Mahbubur Rashid
(74) *Attorney, Agent, or Firm* — Dinsmore & Shohl LLP

(57) ABSTRACT

A pipeline includes a pipeline body in which fluid flows and a throttle formed at a specific position of the pipeline body as a flow passage sectional shape of the pipeline body is changed from that of a remaining portion of the pipeline body. The specific position at which the throttle is provided is a position in the pipeline body and corresponds to a position that serves as an abdominal part of the pipeline in a vibration mode where a resonance frequency is the closest to a pulsation frequency of pressure pulsation caused by the fluid.

12 Claims, 8 Drawing Sheets

(56) References Cited

FOREIGN PATENT DOCUMENTS

| | | | | |
|---|---|---|---|---|
| CN | 104330134 | B | * | 12/2017 |
| CN | 104010898 | B | * | 8/2018 |
| CN | 110185670 | A | * | 8/2019 |
| CN | 110235748 | A | * | 9/2019 |
| CN | 110470166 | A | * | 11/2019 |
| DE | 3810801 | A1 | * | 10/1989 |
| DE | 102013200369 | A1 | * | 7/2014 |
| EP | 3745095 | A1 | * | 12/2020 |
| JP | H04191593 | A | | 7/1992 |
| JP | H06024306 | A | | 2/1994 |
| JP | H09221782 | A | | 8/1997 |
| JP | 3064402 | B2 | * | 12/2004 |
| JP | 2005-201323 | A | | 7/2005 |
| JP | 2006-307667 | A | | 11/2006 |
| JP | 6469155 | B2 | | 2/2019 |

* cited by examiner

| MODE | ORIGINAL FREQUENCY [Hz] | FREQUENCY WITH THROTTLE ADDED [Hz] |
|---|---|---|
| 6 | 94 | 103 |
| 7 | 121 | 115 |
| 8 | 168 | 165 |
| 9 | 184 | 191 |
| 10 | 254 | 254 |
| 11 | 291 | 278 |
| 12 | 351 | 346 |

$f_p$ (=185Hz)

FIG. 9
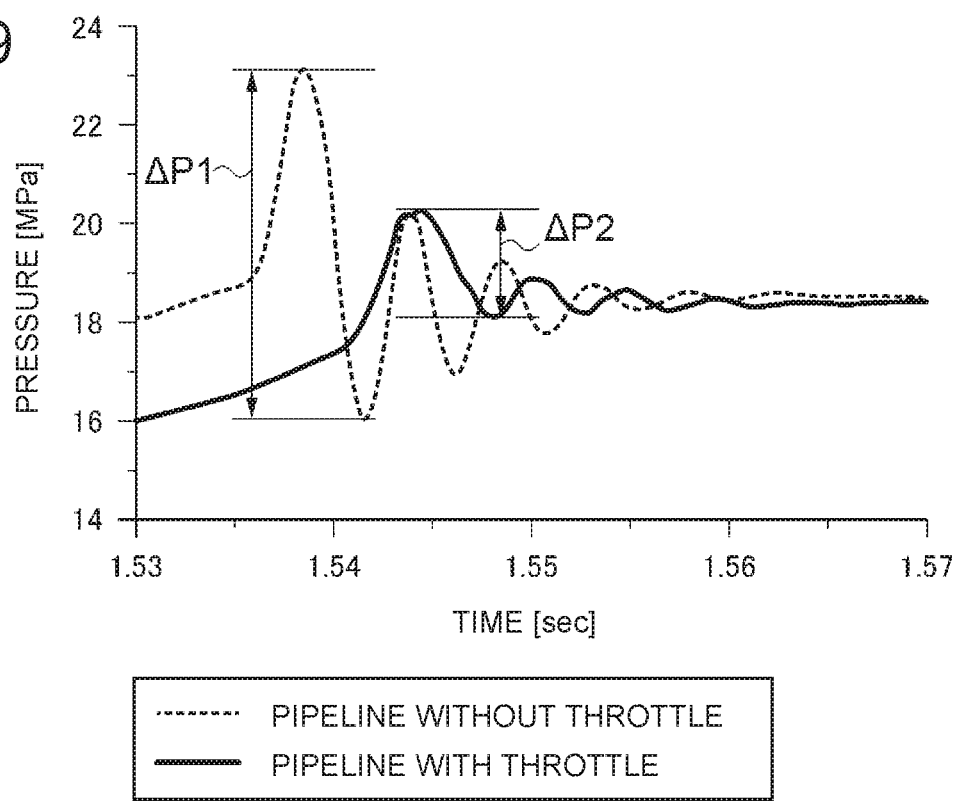
FIG. 10
| RATIO OF LENTGH TO WIDTH (b/a) | THROTTLE WIDTH (mm) | FREQUENCY CHANGE AMOUNT (Hz) |
|---|---|---|
| 1.5 | 5.0 | 3.6 |
| 2.0 | 5.0 | 7.2 |
FIG. 11
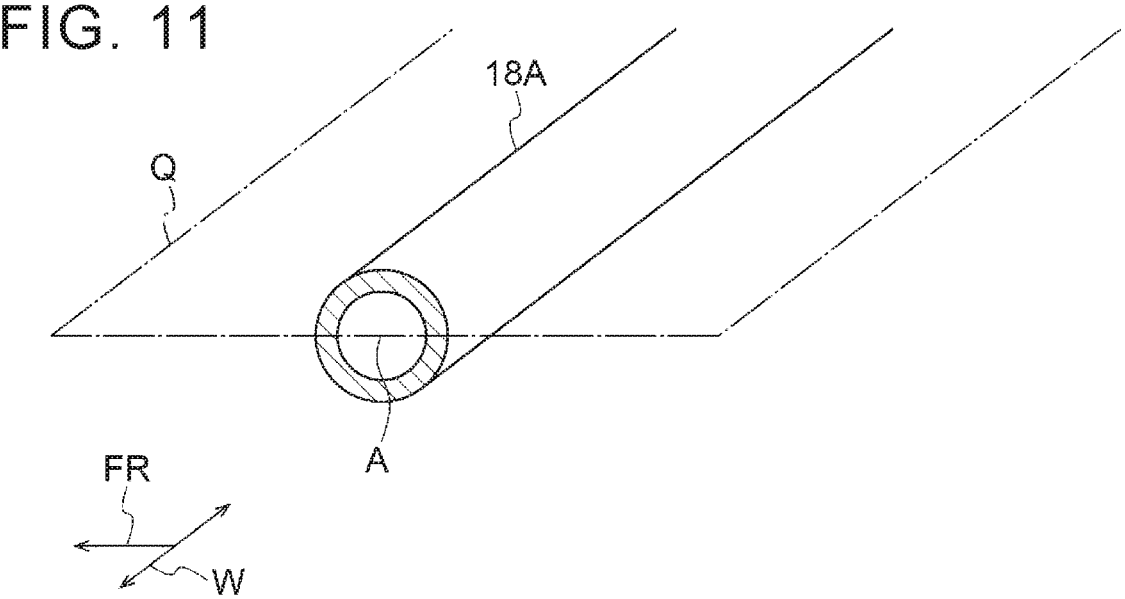

PIPELINE AND BRAKING SYSTEM

CROSS-REFERENCE TO RELATED APPLICATIONS

This application claims priority to Japanese Patent Application No. 2019-141536 filed on Jul. 31, 2019, which is incorporated herein by reference in its entirety including the specification, drawings and abstract.

BACKGROUND

1. Technical Field

The present disclosure relates to a pipeline and a braking system.

2. Description of Related Art

In a braking system of a vehicle, braking force is generated as fluid pressure generated in a master cylinder in accordance with an operation amount of a brake pedal and fluid pressure accumulated in an accumulator are supplied to a caliper cylinder of each wheel.

In the braking system, as a flow regulating valve of the master cylinder is closed, an oil hammer is generated in fluid inside a pipeline that connects the accumulator and the master cylinder, and pressure pulsation is generated in the fluid inside the pipeline. As a resonance frequency of the pipeline and a pulsation frequency of the pressure pulsation get closer to each other, resonance happens in the pipeline, and the vibration is transmitted to a vehicle body. As a result, abnormal noise is generated.

Meanwhile, when a vehicle is an electric vehicle or a hybrid vehicle, operating sound is heard more easily in a low-speed region due to silence of the vehicle, and it may be more likely that an occupant complains about abnormal noise. During automated driving of a vehicle, a braking operation is performed regardless of an operation by an occupant. Therefore, it may be more likely that an occupant has a sense of discomfort about operating sound.

Therefore, operating sound generated in a braking system has been reduced. In particular, it has been desired to suppress vibration of a pipeline caused by resonance and so on of the pipeline based on the pressure pulsation.

SUMMARY

As a method for suppressing pressure pulsation of the pipeline, it is proposed that an orifice (a throttle) is provided in the pipeline so that pulsation is suppressed (see Japanese Unexamined Patent Application Publication No. 2005-201323 (JP 2005-201323 A)).

However, in terms of suppression of resonance of the pipeline, there is room for improvement in a position where the orifice is arranged.

An object of the present disclosure is to provide a pipeline and a braking system in which vibration of the pipeline caused by pulsation of fluid is suppressed in consideration of above facts.

A pipeline described in a first aspect includes a pipeline body in which fluid flows, and a throttle formed at a specific position in the pipeline body as a flow passage sectional shape of the pipeline body is changed from a flow passage sectional shape of a remaining portion of the pipeline body. The specific position is a position in the pipeline body and corresponds to a position that serves as an abdominal part in a vibration mode of the pipeline body before the throttle is formed. In this vibration mode, a resonance frequency is the closest to a pulsation frequency of pressure pulsation caused by the fluid inside the pipeline body before the throttle is formed.

In this pipeline, when pressure pulsation is generated in the fluid in the pipeline body before the throttle is formed, the vibration mode of the pipeline body before the throttle is formed is referred to. In this vibration mode, the resonance frequency is the closest to the pulsation frequency of the pressure pulsation. The throttle is formed at the position of the pipeline body, the position corresponding to the position serving as the abdominal part in an oscillatory wave form of the pipeline body before the throttle is formed in this vibration mode, and the throttle is formed as the sectional shape of the pipeline body is changed from that of the remaining portion of the pipeline body other than the throttle.

Therefore, the resonance frequency in the foregoing vibration mode of the pipeline body in which the throttle is provided is separated from the pulsation frequency more than the resonance frequency of the pipeline body before the throttle is formed in the foregoing vibration mode, and resonance of the pipeline caused by pulsation is thus suppressed.

Further, the throttle is provided at the position in the pipeline body, the position corresponding to the position of the abdominal part of the pipeline body before the throttle is formed in the foregoing vibration mode. Therefore, vibration (amplitude) of the pipeline caused by the resonance is suppressed.

Further, since the throttle is formed in a part of the pipeline body so that the sectional shape of the pipeline body is different from the sectional shape of the remaining portion of the pipeline body other than the throttle, pulsation of fluid is suppressed.

Thus, vibration of the pipeline caused by pulsation of fluid is suppressed.

The "pipeline body before the throttle is formed" is formed into substantially the same shape as that of the pipeline body, and the only difference from the pipeline body is that there is no throttle. Therefore, the flow passage sectional shape and a flow passage sectional area of the pipeline body before the throttle is formed are constant throughout the entire length.

Further, the "substantially the same shape" means that the pipeline body before the throttle is formed, and the pipeline body are the same except for presence or absence of the throttle.

Furthermore, the "abdominal part" represents a position in the pipeline body excluding joint positions in an oscillatory wave form of the pipeline body before the throttle is formed in the vibration mode of the pipeline body before the throttle is formed, the vibration mode is a mode in which the resonance frequency is the closest to the pulsation frequency of the pipeline body before the throttle is formed.

Also, the sentence "the flow passage sectional shape of the pipeline body is changed from the flow passage sectional shape of the remaining portion of the pipeline body" represents a case where the flow passage sectional shape of the pipeline body is different from that of the remaining portion of the pipeline body but the flow passage sectional area of the pipeline body is the same as that of the remaining portion of the pipeline body, or reduced in comparison to that of the remaining portion of the pipeline body.

A pipeline according to a second aspect of the pipeline described in the first aspect in which the flow passage sectional area of the throttle is the same as the flow passage sectional area of the remaining portion of the pipeline body.

In this pipeline, the flow passage sectional area of the throttle provided in the pipeline body is the same as the flow passage sectional area of the remaining portion of the pipeline body. This means that the only difference between the throttle and the remaining portion of the pipeline body is the flow passage sectional shape, and the flow passage sectional areas are the same. Therefore, a pressure loss in the pipeline due to the throttle is suppressed.

For example, when this pipeline is applied to a pipeline on a braking system, an influence on braking performance caused by the throttle being provided is suppressed.

A pipeline according to a third aspect is the pipeline described in the first aspect or second aspect in which a sectional shape of the throttle is an elliptical shape.

In this pipeline, the sectional shape of the throttle is the elliptical shape. Therefore, when the throttle is formed in the pipeline body, it is possible to easily form the throttle as the subject portion of the pipeline body having a circular section is deformed by pressing.

The "elliptical shape" includes a shape in which semicircles are connected to each other through an external common tangent, in other words, a so-called an "oblong shape".

A pipeline according to a fourth aspect is the pipeline described in the third aspect in which the throttle is formed in the pipeline body so that a long diameter direction of the elliptical shape coincides with a vibration direction of the pipeline body before the throttle is formed. The vibration direction is a direction in which an amplitude becomes maximum in the vibration mode.

In this pipeline, the throttle is formed in the pipeline body so that the long diameter direction of the throttle having the elliptical sectional shape coincides with the maximum amplitude direction in the vibration mode of the pipeline body before the throttle is formed. In this vibration mode, the resonance frequency is the closest to the pulsation frequency. This means that, at the position in the pipeline body where the throttle is formed, bending rigidity in the maximum amplitude direction around an axis of the pipeline body is set to be the highest among bending rigidity in the other directions. As a result, it is possible to effectively suppress vibration of the pipeline.

When the "elliptical shape" is the so-called "oblong shape", the "long diameter direction" represents a direction in which the centers of the semicircles are connected to each other.

A pipeline according to fifth aspect is the pipeline described in any one of the first aspect to the fourth aspect in which the specific position is a position in the pipeline body, the position corresponding to a position within an effective range in the vibration mode.

In this pipeline, when pressure pulsation is generated in fluid in the pipeline body before the throttle is formed, in the vibration mode of the pipeline body before the throttle is formed in which the resonance frequency is the closest to the pulsation frequency of the pressure pulsation, the throttle is formed at the position in the pipeline body, the position corresponding to the position serving as the effective range in the oscillatory wave form of the pipeline body before the throttle is formed. The throttle is formed as the sectional shape of the pipeline body is changed from the sectional shape of the remaining portion.

Since the throttle is at the position of the pipeline body, the position corresponding to the position serving as the effective range in the vibration mode of the pipeline body before the throttle is formed, it is possible to effectively suppress vibration (amplitude) of the pipeline caused by resonance.

The "effective range" is a range in each of the abdominal parts and a range that extends for one sixth of an length of the abdominal part before and after the abdominal position (the peak) that serves as the center of the effective range.

A pipeline according to a sixth aspect is the pipeline described in any one of the first aspect to the fourth aspect in which the specific position is a position in the pipeline body, the position corresponding to the abdominal position in the vibration mode.

In this pipeline, when pressure pulsation is generated in fluid in the pipeline body before the throttle is formed, in the vibration mode of the pipeline body before the throttle is formed in which resonance frequency is the closest to the pulsation frequency of the pressure pulsation, the throttle is formed at the position in the pipeline body, the position corresponding to the abdominal position in the oscillatory wave form of the pipeline body before the throttle is formed. The throttle is formed as the sectional shape of the pipeline body is changed from the sectional shape of the remaining portion.

Since the throttle is formed at the position of the pipeline body, the position corresponding to the abdominal position in the vibration mode of the pipeline body before the throttle is formed, it is possible to more effectively suppress vibration (amplitude) of the pipeline caused by resonance.

The "abdominal position" is a maximum amplitude position (a peak) in each of the abdominal parts.

A braking system according to a seventh aspect includes a master cylinder, an accumulator, and the pipeline described in any one of the first aspect to the sixth aspect. The master cylinder generates fluid pressure according to an operation amount of a brake pedal. The accumulator accumulates assisting fluid pressure. The pipeline described in any one of the first aspect to the sixth aspect is a pipeline that connects the master cylinder and the accumulator to each other so that fluid is supplied to the master cylinder from the accumulator.

In this braking system, the pipeline described in any one of the first aspect to the sixth aspect is applied to a pipeline that connects the accumulator and the master cylinder to each other.

As a valve body of the master cylinder is closed, pressure pulsation is generated in fluid inside the pipeline that connects the accumulator and the master cylinder to each other, and, when a pulsation frequency of this pressure pulsation and a resonance frequency of the pipeline body are close to each other, the pipeline body resonates and a vibration amount of the pipeline body increases.

However, in this braking system, the throttle is provided at a position in the pipeline body, the position corresponding to a position of the abdominal part in the vibration mode of the pipeline body before the throttle is formed. In this vibration mode, the resonance frequency is the closest to the pulsation frequency of the pipeline body before the throttle is formed. Therefore, the resonance frequency in the vibration mode of the pipeline in which the throttle is provided is separated from the pulsation frequency, and resonance of the pipeline is thus suppressed. Further, the throttle is provided at the position of the pipeline body, the position corresponding to the position of the abdominal part in the vibration mode of the pipeline body before the throttle is formed. Therefore, vibration (amplitude) of the pipeline caused by resonance is suppressed. Further, since the throttle is provided in the pipeline body, it is possible to suppress pressure pulsation inside the pipeline. As a result, generation of abnormal noise is suppressed, the abnormal noise being generated as vibration of the pipeline caused by pulsation of fluid in the braking system is transmitted to a vehicle body.

As described so far, with the present disclosure described in the first aspect and the fourth aspect to the sixth aspect, it is possible to suppress vibration of the pipeline caused by pulsation of fluid.

Further, with the present disclosure described in the second aspect, it is possible to suppress a pressure loss caused by the throttle being provided in the pipeline.

Furthermore, with the present disclosure described in the aspect, it is possible to form the throttle easily in the pipeline body.

With the present disclosure described in the seventh aspect, it is possible to suppress vibration of the pipeline caused by pulsation of the fluid in the braking system.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 is a graph showing pulsation states of the pipelines according to the comparative example and the embodiment, respectively;

FIG. 10 is a table showing a relation between a ratio between a long diameter and a short diameter of the throttle, and a frequency change amount;

FIG. 11 is a perspective view describing a maximum amplitude plane Q; and

DETAILED DESCRIPTION OF EMBODIMENTS

A pipeline and a braking system according to an embodiment are described with reference to FIG. 1 to FIG. 12. In the description below, an arrow FR represents a vehicle frontward direction, an arrow UP represents a vehicle upward direction, and an arrow W represents a vehicle width direction in each of the drawings.

Braking System

First of all, a braking system 10 is described briefly.

Figure 1:
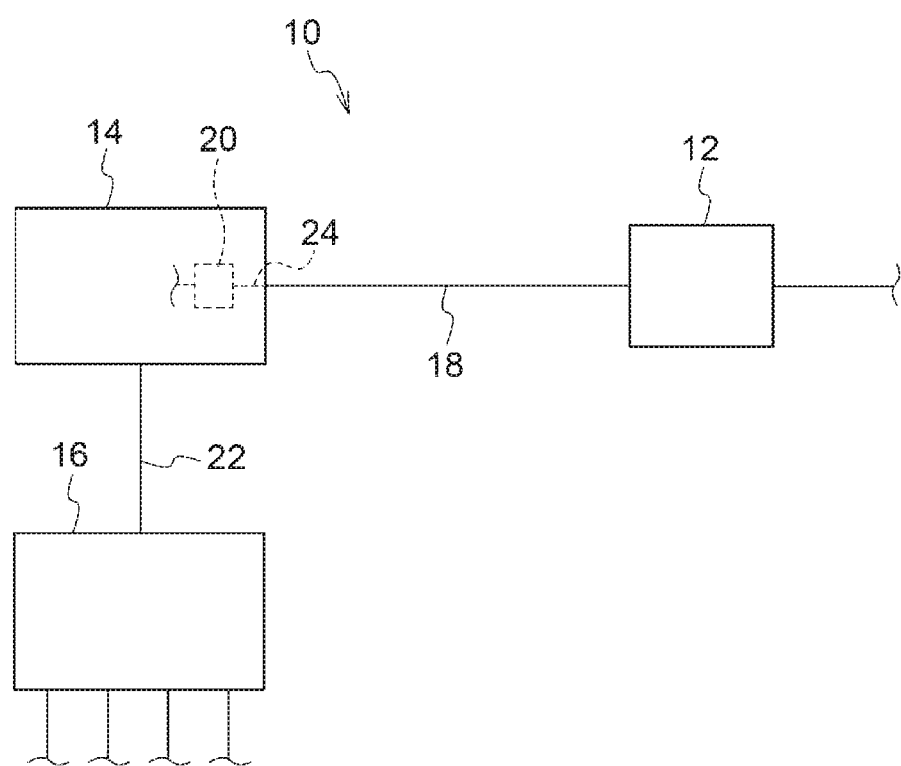
FIG. 1 is a schematic configuration view of a main part of a braking system according to an embodiment.

As shown in FIG. 1, the braking system 10 includes an accumulator 12, a master cylinder 14, and a brake actuator 16.

The accumulator 12 increases (accumulates) pressure of fluid that is supplied through a pump or the like, and supplies the fluid to the master cylinder 14 through a pipeline 18. Thus, assisting fluid pressure is supplied to the master cylinder 14.

In the pipeline 18, a later-described throttle 30 is formed as a sectional shape of a pipeline body 28 at a given position is deformed locally.

The master cylinder 14 generates fluid pressure in accordance with an operation amount of a brake pedal, and also adjusts the assisting fluid pressure supplied from the accumulator 12 to given fluid pressure with use of a flow regulating valve 20 provided inside the master cylinder 14.

Fluid pressure adjusted in the master cylinder 14 is supplied to the brake actuator 16 through a pipeline 22.

As the flow regulating valve 20 is closed, an oil hammer is generated in high-pressure fluid supplied from the accumulator 12, and pressure pulsation is thus generated in the fluid inside the pipeline 18.

The fluid pressure supplied from the master cylinder 14 is supplied by the brake actuator 16 to respective caliper cylinders in front and rear wheels (not shown). Thus, given braking force is applied to the wheels.

Figure 2:
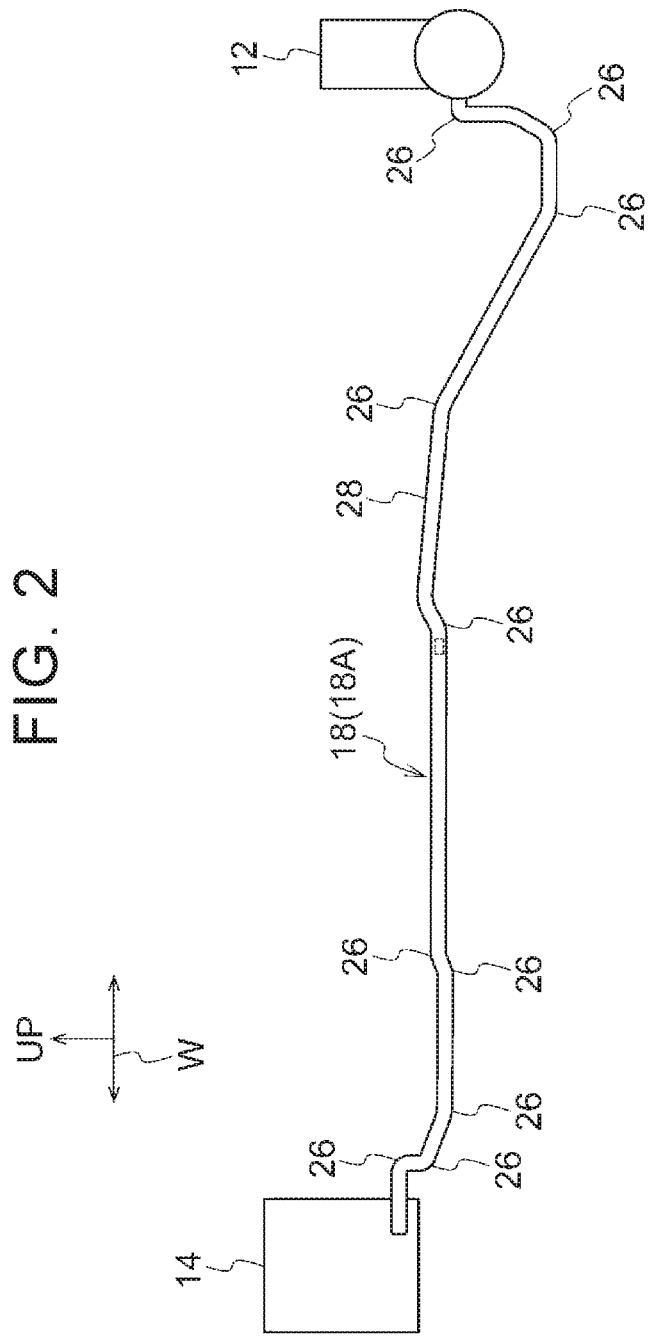
FIG. 2 is a front view of a pipeline between an accumulator and a master cylinder according to the embodiment.

As shown in FIG. 2, for example, a plurality of bent portions 26 is formed in the pipeline 18.

Also, the pipeline 18 includes the pipeline body 28 in which a flow passage is formed inside, and a throttle 30 at a given position of the pipeline body 28. The throttle 30 has a flow passage sectional shape (see FIG. 6B) that is different from a flow passage sectional shape (see FIG. 6A) of a remaining portion 28A of the pipeline body 28.

Throttle of Pipeline

Next, the throttle 30 of the pipeline 18 is described in detail. First of all, the pipeline 18 without the throttle 30 is considered. In other words, a flow passage sectional shape and a flow passage sectional area of the pipeline 18 are constant throughout the entire length of the pipeline 18 (hereinafter, referred to as a "pipeline 18A" in order to distinguish from the pipeline 18 in which the throttle is formed). A method for deciding a throttle forming position in the pipeline 18 with use of the pipeline 18A is described. The pipeline 18A corresponds to a "pipeline body before a throttle is formed".

How to Decide a Throttle Position

A position where the throttle 30 is formed in the pipeline 18 is decided as follows.

1. Calculation of Pulsation Frequency

In the braking system 10, as the flow regulating valve 20 of the master cylinder 14 is closed, an oil hammer is generated in high-pressure fluid supplied from the accumulator 12, and pressure pulsation is thus generated inside the pipeline 18A.

Figure 3:
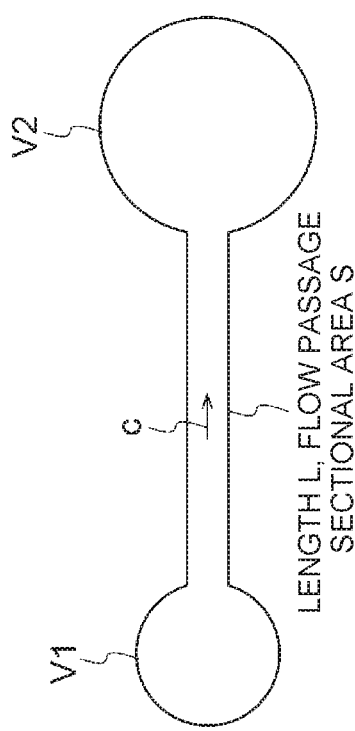
FIG. 3 is a view of a Helmholtz resonance model.

A pulsation frequency of the pressure pulsation generated in the pipeline 18A is obtained based on a Helmholtz resonance model shown in FIG. 3 and the following equation (1). This means that, as shown in FIG. 3, the Helmholtz resonance model is considered in which containers having volumes V1, V2, respectively, are connected to both ends of a pipeline, respectively. In the pipeline, its flow passage sectional area is S, and its length is L.

When this model is applied to this embodiment, the volume V1 represents a volume of an internal flow passage 24 from an end portion of the master cylinder 14 connected to the pipeline 18A through the flow regulating valve 20. The volume V2 represents a volume of an internal flow passage of the accumulator 12 and an accumulation chamber.

The length L of the pipeline represents a length of the pipeline 18A in its axis direction, and the flow passage sectional area S represents a flow passage sectional area of the pipeline 18A. The symbol c represents speed of sound.

$$f_P = \frac{c}{2\pi}\sqrt{\left(\frac{1}{V_1} + \frac{1}{V_2}\right)\frac{S}{L}} \quad (1)$$

As these values are assigned to the above equation (1), a pulsation frequency fp of the pressure pulsation of the fluid in the pipeline 18A is obtained.

2. Calculation of Resonance Frequency

Next, a resonance frequency of the pipeline 18A is obtained.

Figures 4, 5:
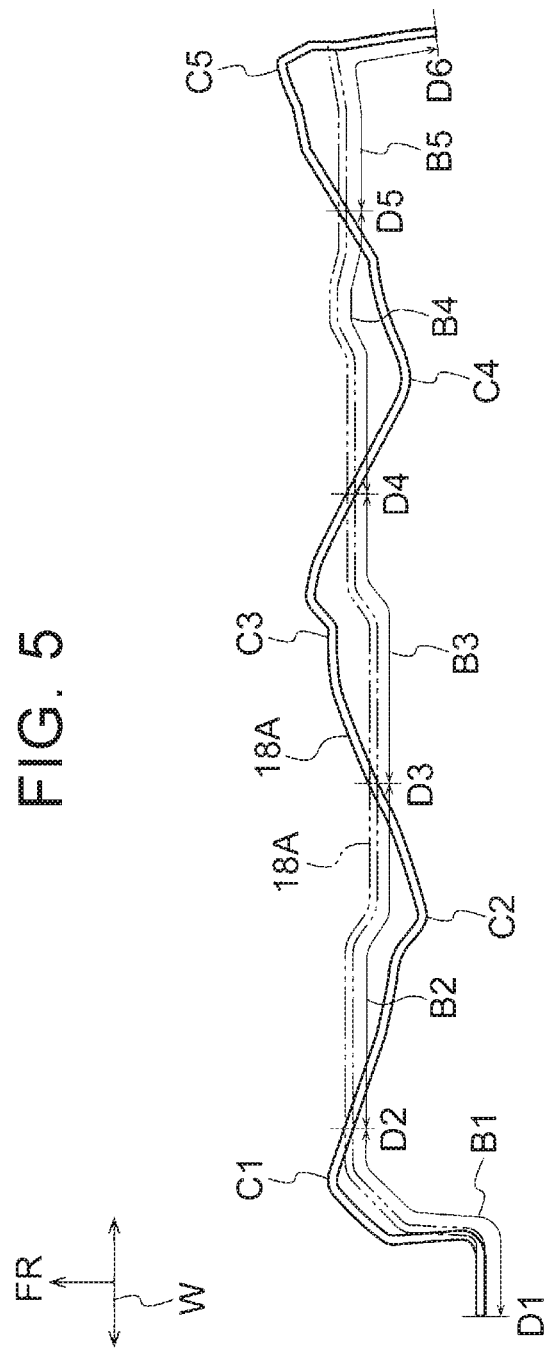
FIG. 4 is a table showing resonance frequencies in each vibration mode with and without a throttle in the pipeline according to the embodiment.
FIG. 5 is a view of an oscillatory wave form when there is no throttle in a ninth vibration mode.

From a numerical analysis model based on the data of the pipeline 18A, a resonance frequency ("an original frequency" in FIG. 4) in each vibration mode of the pipeline 18A without the throttle is obtained. FIG. 4 only shows vibration modes of the pipeline 18A near the pulsation frequency fp.

3. Selection of Vibration Mode

Next, out of the obtained vibration modes of the pipeline 18A, a vibration mode with a resonance frequency closest to the pulsation frequency fp is selected. Here, as shown in FIG. 4, when it is assumed that the pulsation frequency fp is 185 Hz, the vibration mode with the resonance frequency (the original frequency) closest to the pulsation frequency fp is a ninth vibration mode (184 Hz).

4. Specification of Vibration Direction

A vibration state of the pipeline 18A in the ninth vibration mode (for example, see FIG. 5) is obtained from a numerical analysis model, and an amplitude direction in which the pipeline 18A has a maximum amplitude amount is defined as a maximum amplitude direction. Here, for example, when the vehicle front-rear direction is the maximum vibration direction, an oscillatory wave form of the pipeline 18A on a maximum amplitude plane Q is referred to as shown in FIG. 11. The maximum amplitude plane Q includes an axis A of the pipeline 18A and extends in the maximum amplitude direction and an axis direction of the pipeline 18A. Specifically, as shown in FIG. 5, when the maximum amplitude direction of the pipeline 18A is the vehicle front-rear direction, the oscillatory wave form on a horizontal plane (the maximum amplitude plane Q) including the axis A of the pipeline 18A is referred to.

FIG. 5 shows a vibration state of the pipeline 18A on the maximum amplitude plane Q (the horizontal plane). A double chain line represents a non-vibration state, and a solid line represents a vibration state in the ninth vibration mode.

Among vertexes (abdominal positions) C1 to C5 of five abdominal parts B1 to B5 in the oscillatory wave form of the pipeline 18A, the throttle 30 (not shown in FIG. 5) is formed at the abdominal position C3 (the maximum amplitude position) with the largest amplitude.

The "abdominal part" is a portion between neighboring joint positions (the portions excluding joint positions D1 to D6) of the pipeline 18A in a vibration mode of the pipeline 18A with a resonance frequency (an original frequency) closest to the pulsation frequency fp (for example, the ninth vibration mode). For example, the abdominal part B3 is a portion between the neighboring joint positions D3, D4 in the oscillatory wave form in the ninth vibration mode of the pipeline 18A, and is also a portion excluding the joint positions D3, D4.

Shape of Throttle

Next, a sectional shape of the throttle 30 of which the position to be formed in the pipeline 18 (the pipeline body 28) is decided is described. The sectional shape (a flow passage sectional shape) of the throttle 30 is an elliptical shape (see FIG. 6B), while a sectional shape (a flow passage sectional shape) of the remaining portion 28A of the pipeline 18 (the pipeline body 28) is a circular shape (see FIG. 6A).

Further, a flow passage sectional area S1 (=πab) of the throttle 30 is set to be equal to a flow passage sectional area S0 (=πr²) of the remaining portion of the pipeline 18.

Here, r represents a radius of the circle, and 2a, 2b represent a long diameter and a short diameter of the ellipse, respectively.

Further, the throttle 30 is formed so that an extending direction of the long diameter (hereinafter, referred to as a "long diameter direction") coincides with the maximum amplitude direction of the pipeline 18A on a section orthogonal to the axis direction of the pipeline body 28. In this embodiment, the throttle 30 is formed so that the long diameter direction of the throttle 30 coincides with the vehicle front-rear direction (see FIG. 7A to FIG. 7C).

Effects

Effects of the pipeline 18 and the braking system 10 according to this embodiment are described.

In the braking system 10, as fluid pressure in accordance with an operation amount of the brake pedal (not shown) by an occupant, and fluid pressure accumulated in the accumulator 12 are supplied to the master cylinder 14, the fluid pressure acts on the brake actuator 16 from the master cylinder 14, and the fluid pressure acts on the caliper cylinders of the four wheels on the front, the rear, the right, and the left (not shown). Thus, braking force is generated.

Here, for example, when the flow regulating valve 20 provided in the master cylinder 14 is closed due to an end of the braking operation by the occupant, an oil hummer is generated in the fluid inside the pipeline 18 with pressure increased by the accumulator 12, and pressure pulsation is generated in the fluid inside the pipeline 18 that connects the accumulator 12 and the master cylinder 14 to each other.

Here, the throttle 30 is provided at a position in the pipeline body 28, the position corresponding to the maximum amplitude position (the abdominal position C3) in a vibration mode in which the resonance frequency is the closest to the pulsation frequency fp of the pressure pulsation in the pipeline 18A. As a result, as shown in FIG. 4, the resonance frequency (the original frequency of 184 Hz) in the ninth vibration mode of the pipeline 18A, the resonance frequency being the closest to the pulsation frequency fp, is changed to a resonance frequency (a frequency of 191 Hz with the throttle added) in the ninth vibration mode of the pipeline 18 in which the throttle 30 is provided at a given position of the pipeline body 28. This means that resonance frequency of the pipeline 18 is separated from the pulsation frequency fp in comparison to the resonance frequency of the pipeline 18A, and resonance of the pipeline 18 is thus suppressed.

Further, as shown in FIG. 10, as a ratio (b/a) between the long diameter 2a and the short diameter 2b of the elliptical shape that is the flow passage sectional shape of the throttle 30 formed in the pipeline 18 is changed, it is possible to adjust a frequency change amount of a resonance frequency (between the original frequency and the frequency with the throttle added). Therefore, as the ratio (b/a) between the long diameter 2a and the short diameter 2b of the ellipse of the throttle 30 is adjusted, it is possible to change the resonance frequency (the original frequency of 184 Hz) of the pipeline 18A closest to the pulsation frequency fp (185 Hz) to the resonance frequency (the frequency of 191 Hz with the throttle added) of the pipeline 18 that is reliably separated from the pulsation frequency fp. A throttle width in FIG. 10 means a throttle length in the axis direction of the pipeline 18A.

Further, the throttle 30 is formed at the position in the pipeline body 28, the position corresponding to a position of the abdominal part in the oscillatory wave form of the pipeline 18A on the maximum amplitude plane Q in the ninth vibration mode of the pipeline 18A. Therefore, it is possible to suppress vibration (amplitude) of the pipeline 18. In particular, since the throttle 30 is provided at the maximum amplitude position (the abdominal position with the maximum amplitude amount out of the abdominal positions C1 to C5) C3, an effect of suppressing vibration is enhanced.

Moreover, on the section of the pipeline 18, the maximum amplitude direction and the long diameter direction of the throttle 30 coincide with each other. In other words, at the position of the pipeline 18 where the throttle 30 is formed, bending rigidity in the maximum amplitude direction around the axis of the pipeline 18 is set to be the highest among bending rigidity in the other directions. Hence, vibration of the pipeline 18 in the maximum amplitude direction is suppressed further.

Further, because the throttle 30 is provided in the pipeline 18, pressure pulsation in the pipeline 18 is suppressed, and resonance of the pipeline 18 based on the pressure pulsation is suppressed even further. As shown in FIG. 9, maximum pressure amplitude ΔP2 of the pressure pulsation of the pipeline 18 in which the throttle 30 is provided is suppressed so as to be about one third of maximum pressure amplitude ΔP1 of the pressure pulsation of the pipeline 18A without the throttle.

Due to this, vibration of the pipeline 18 caused by the pressure pulsation is suppressed. This means that generation of abnormal noise is suppressed, the abnormal noise being generated as vibration of the pipeline 18 of the braking system 10 is transmitted to a vehicle body that supports the pipeline 18.

Figure 6A:
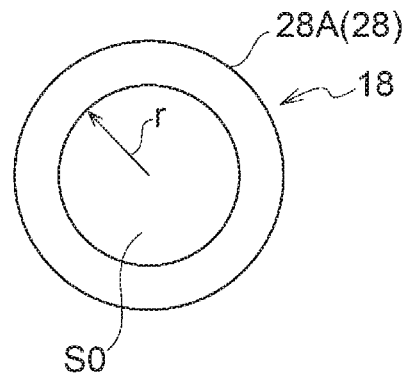
FIG. 6A is a sectional view of a portion of the pipeline according to the embodiment other than a throttle portion.
Figure 6B:
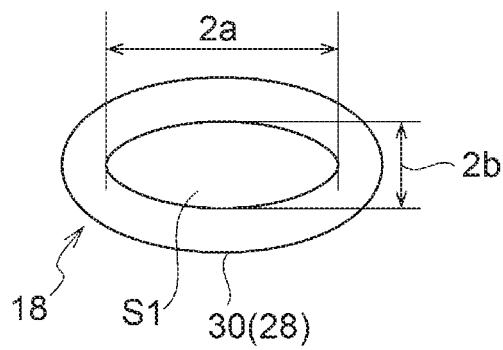
FIG. 6B is a sectional view of the throttle portion of the pipeline according to the embodiment.

Also, the throttle 30 has the elliptical sectional shape (see FIG. 6B) while the remaining portion 28A of the pipeline body 28 has a circular sectional shape (see FIG. 6A). However, because the flow passage sectional area S1 (see FIG. 6B) is equal to the flow passage sectional area S0 (see FIG. 6A) of the remaining portion 28A, a pressure loss when the fluid passes in the throttle 30 is minimized. This means that deterioration of breaking performance such as a reduction of fluid pressure is suppressed even when the throttle 30 is provided in the pipeline 18 (the pipeline body 28) of the braking system 10.

Figure 8A:
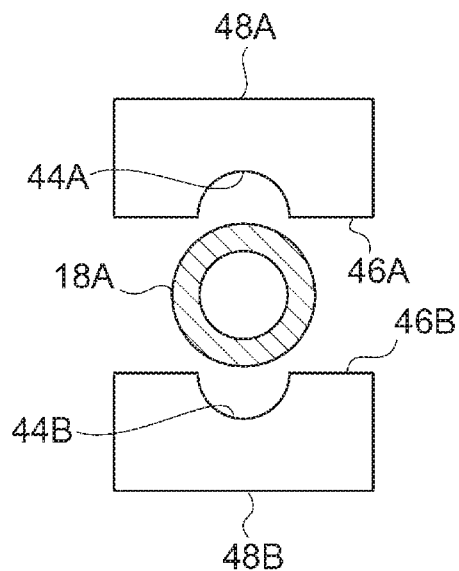
FIG. 8A is a view describing a state of forming a throttle according to a comparative example.
Figure 8B:
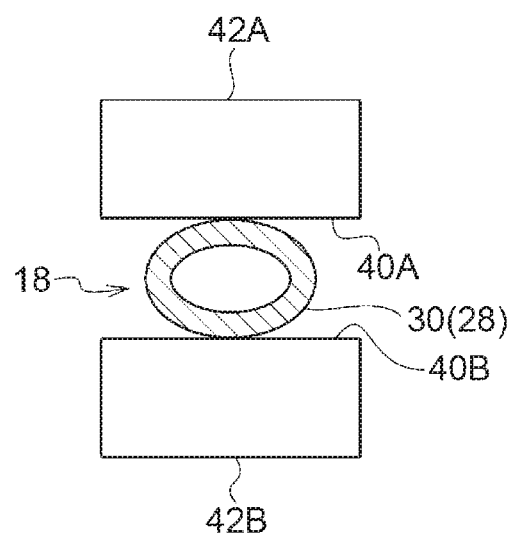
FIG. 8B is a view describing a state of forming the throttle according to the embodiment.

Further, since the sectional shape of the throttle 30 is the elliptical shape, it is possible to form the throttle 30 (with the elliptical sectional shape) as a subject portion (with the circular sectional shape) of the pipeline body 28 is pressed by an upper die 42A and a lower die 42B in which forming surfaces 40A, 40B are plane surfaces, respectively, as shown in FIG. 8B.

On the contrary, when a throttle having a circular sectional shape is formed as a diameter of a subject portion of the pipeline 18A having the circular sectional shape is reduced, it is necessary to newly manufacture an upper die 48A and a lower die 48B in which depressed portions 44A, 44B for the throttle are formed in the forming surfaces 46A, 46B, respectively, as shown in FIG. 8A. Therefore, manufacturing cost for the pipeline 18 and the braking system 10 increases.

This means that, because the throttle 30 has the elliptical sectional shape, it is possible to form the throttle 30 only by simple pressing of the subject portion of the pipeline body 28 having the circular sectional shape, and it is possible to reduce manufacturing cost of the pipeline 18.

In particular, when a resonance phenomenon caused by pressure pulsation happens in the existing pipeline 18A, it is only necessary to add the throttle 30 with the elliptical sectional shape by simple pressing without a change of a basic configuration of the pipeline 18A. Therefore, while an increase in manufacturing cost for the pipeline 18 (the braking system 10) is minimized, it is possible to effectively suppress generation of abnormal noise caused by resonance of the pipeline based on the pulsation.

OTHER EMBODIMENTS

In the foregoing embodiment, the throttle 30 is provided in the maximum amplitude position (the abdominal position C3) in the vibration mode (the ninth vibration model) of the pipeline 18A in which the resonance frequency is the closest to the pulsation frequency fp. However, an applicable embodiment of the present disclosure is not limited to this. For example, the throttle 30 may be formed at any of the five abdominal positions C1 to C5 on the maximum amplitude plane.

Further, the throttle 30 may only be formed in the abdominal parts B1 to B5 including the abdominal positions C1 to C5 (the peaks) on the maximum amplitude plane Q. The abdominal parts B1 to B5 are sections between the neighboring joint positions D1 to D6 of the oscillatory wave form excluding the joint positions D1 to D6. This is because the throttle 30 has an effect of suppressing vibration of the pipeline 18 unless the throttle 30 is formed in the joint positions D1 to D6.

Figure 12:
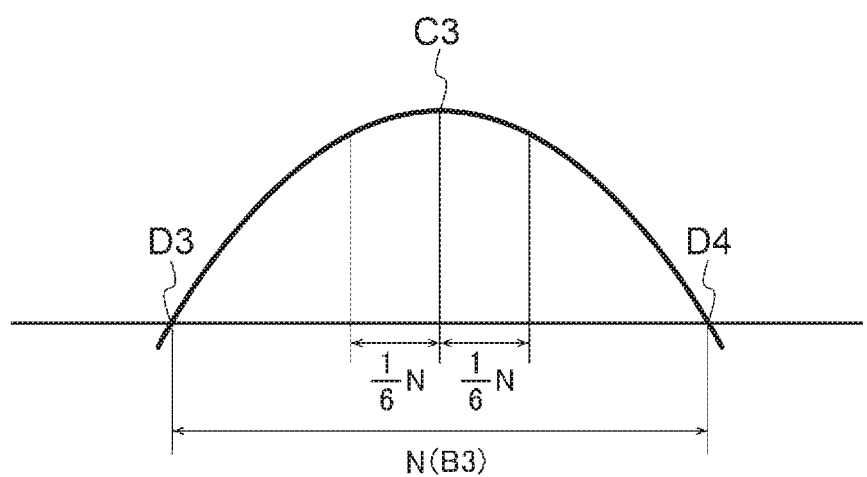
FIG. 12 is a schematic view of an oscillatory wave form, describing a range where the throttle is arranged.

Furthermore, forming the throttle 30 in effective ranges in the abdominal parts B1 to B5 on the maximum amplitude plane Q is highly effective in suppressing vibration. The effective ranges extend for one sixth of the length of the abdominal parts B1 to B5, respectively, before and after the centers of the abdominal positions C1 to C5, respectively. For example, as schematically shown in FIG. 12, when the throttle 30 is provided in the abdominal part B3, and the length of the abdominal part B3 is N, the throttle 30 may be provided in the effective range that is ±⅙N from the abdominal position C3.

Figure 6C:
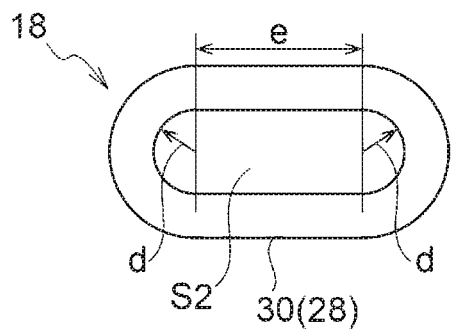
FIG. 6C is a sectional view of the throttle portion according to another example.
Figure 7A:
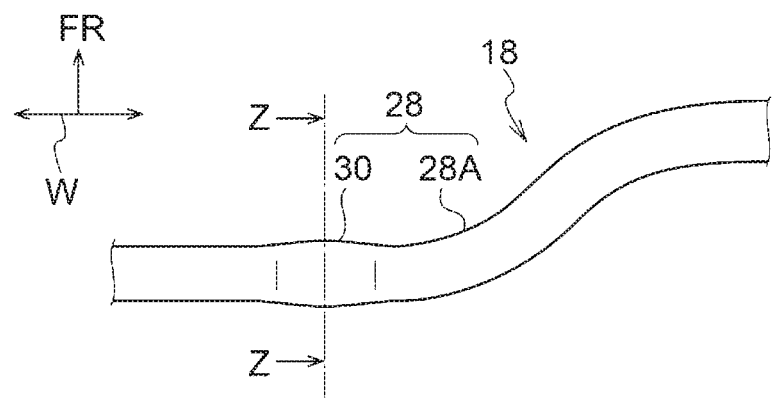
FIG. 7A is a plan view of the vicinity of the throttle of the pipeline according to the embodiment.
Figure 7B:
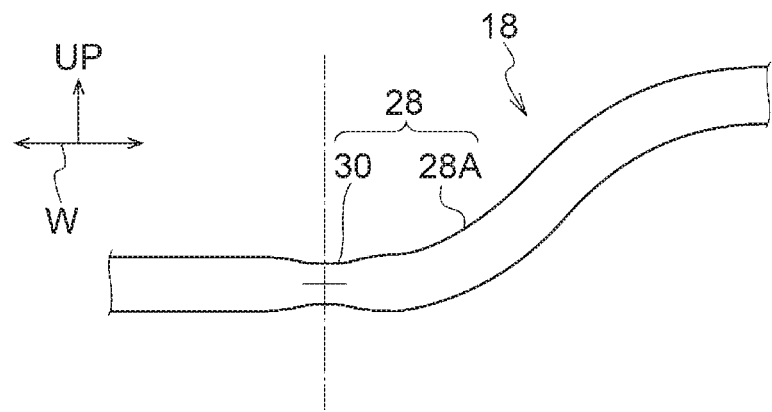
FIG. 7B is a front view of the vicinity of the throttle of the pipeline according to the embodiment.
Figure 7C:
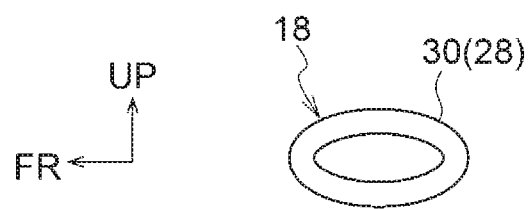
FIG. 7C is a sectional view taken along the line Z-Z in FIG. 7A.

Further, although the throttle 30 has the elliptical sectional shape (the flow passage sectional shape), the sectional shape of the throttle 30 may also be an "oblong shape" in which semicircles are connected to each other through straight lines (see FIG. 6C). In this case, the flow passage sectional area S0 of the remaining portion of the pipeline 18 and a flow passage sectional area S2 of the throttle 30 may coincide with each other. This means that, when a radius of the semicircle is d, and a length of the straight lines is e, a flow passage sectional area S2 ($\pi d^2 + 2de$) may be equal to the flow passage sectional area S0 ($\pi r^2$) of the remaining portion. This is because a pressure loss due to the throttle 30 being provided in the pipeline 18, that is, for example, deterioration of braking performance in the braking system 10 is suppressed.

In this embodiment, the flow passage sectional area S1 (S2) of the throttle 30 is equal to the flow passage sectional area S0 of the remaining portion of the pipeline 18. However, an applicable embodiment of the present disclosure is not limited to this. This means that the sectional area of the throttle 30 may be reduced (narrowed) compared to the sectional area of the remaining portion 28A of the pipeline 18 (the pipeline body 28). As the throttle is provided at a given position of the pipeline 18 (the pipeline body 28), pressure pulsation is suppressed, and vibration (resonance) of the pipeline 18 is suppressed. Thus, it is possible to suppress generation of abnormal noise in the vehicle body. In this case, the throttle may suppress an influence on deterioration of braking performance (pressure loss).

Further, the long diameter direction of the throttle 30 coincides with the maximum amplitude direction of the pipeline 18. However, an applicable embodiment of the present disclosure is not limited to this.

Moreover, in this embodiment, a vibration suppression mechanism is applied to the pipeline 18 that connects the accumulator 12 and the master cylinder 14 of the braking system 10. However, an applicable embodiment of the present disclosure is not limited to this, and may be applied to any pipeline that generates pulsation. For example, the present disclosure is applicable to a pipeline or the like to which pulsated fluid is directly supplied from a pump or the like. Further, the fluid flowing in the pipeline is not limited to fluid.

What is claimed is:

1. A pipeline, comprising:
    a pipeline body in which fluid flows; and
    a throttle formed at a specific position in the pipeline body as a flow passage sectional shape of the pipeline body is changed from a flow passage sectional shape of a remaining portion of the pipeline body, wherein
    the specific position is a position in the pipeline body and corresponds to a position that serves as an abdominal part in a vibration mode of the pipeline body before the throttle is formed, the vibration mode being a mode in which a resonance frequency is closest to a pulsation frequency of pressure pulsation caused by the fluid inside the pipeline body before the throttle is formed.

2. The pipeline according to claim 1, wherein a flow passage sectional area of the throttle is the same as a flow passage sectional area of the remaining portion of the pipeline body.

3. The pipeline according to claim 1, wherein a sectional shape of the throttle is an elliptical shape.

4. The pipeline according to claim 3, wherein the throttle is formed in the pipeline body so that a long diameter direction of the elliptical shape coincides with a vibration direction of the pipeline body before the throttle is formed, the vibration direction being a direction in which an amplitude becomes maximum in the vibration mode.

5. The pipeline according to claim 1, wherein the specific position is a position in the pipeline body, the position corresponding to a position within an effective range in the vibration mode.

6. The pipeline according to claim 1, wherein the specific position is a position in the pipeline body, the position corresponding to an abdominal position in the vibration mode.

7. A braking system, comprising:
    a master cylinder that generates fluid pressure according to an operation amount of a brake pedal;
    an accumulator that accumulates assisting fluid pressure; and
    the pipeline according to claim 1, the pipeline connecting the master cylinder and the accumulator to each other so that fluid is supplied to the master cylinder from the accumulator.

8. A braking system, comprising:
    a master cylinder that generates fluid pressure according to an operation amount of a brake pedal;
    an accumulator that accumulates assisting fluid pressure; and
    the pipeline according to claim 2, the pipeline connecting the master cylinder and the accumulator to each other so that fluid is supplied to the master cylinder from the accumulator.

9. A braking system, comprising:
    a master cylinder that generates fluid pressure according to an operation amount of a brake pedal;
    an accumulator that accumulates assisting fluid pressure; and
    the pipeline according to claim 3, the pipeline connecting the master cylinder and the accumulator to each other so that fluid is supplied to the master cylinder from the accumulator.

10. A braking system, comprising:
    a master cylinder that generates fluid pressure according to an operation amount of a brake pedal;
    an accumulator that accumulates assisting fluid pressure; and
    the pipeline according to claim 4, the pipeline connecting the master cylinder and the accumulator to each other so that fluid is supplied to the master cylinder from the accumulator.

11. A braking system, comprising:
    a master cylinder that generates fluid pressure according to an operation amount of a brake pedal;
    an accumulator that accumulates assisting fluid pressure; and
    the pipeline according to claim 5, the pipeline connecting the master cylinder and the accumulator to each other so that fluid is supplied to the master cylinder from the accumulator.

12. A braking system, comprising:
    a master cylinder that generates fluid pressure according to an operation amount of a brake pedal;
    an accumulator that accumulates assisting fluid pressure; and
    the pipeline according to claim 6, the pipeline connecting the master cylinder and the accumulator to each other so that fluid is supplied to the master cylinder from the accumulator.

* * * * *